Patented Oct. 20, 1931

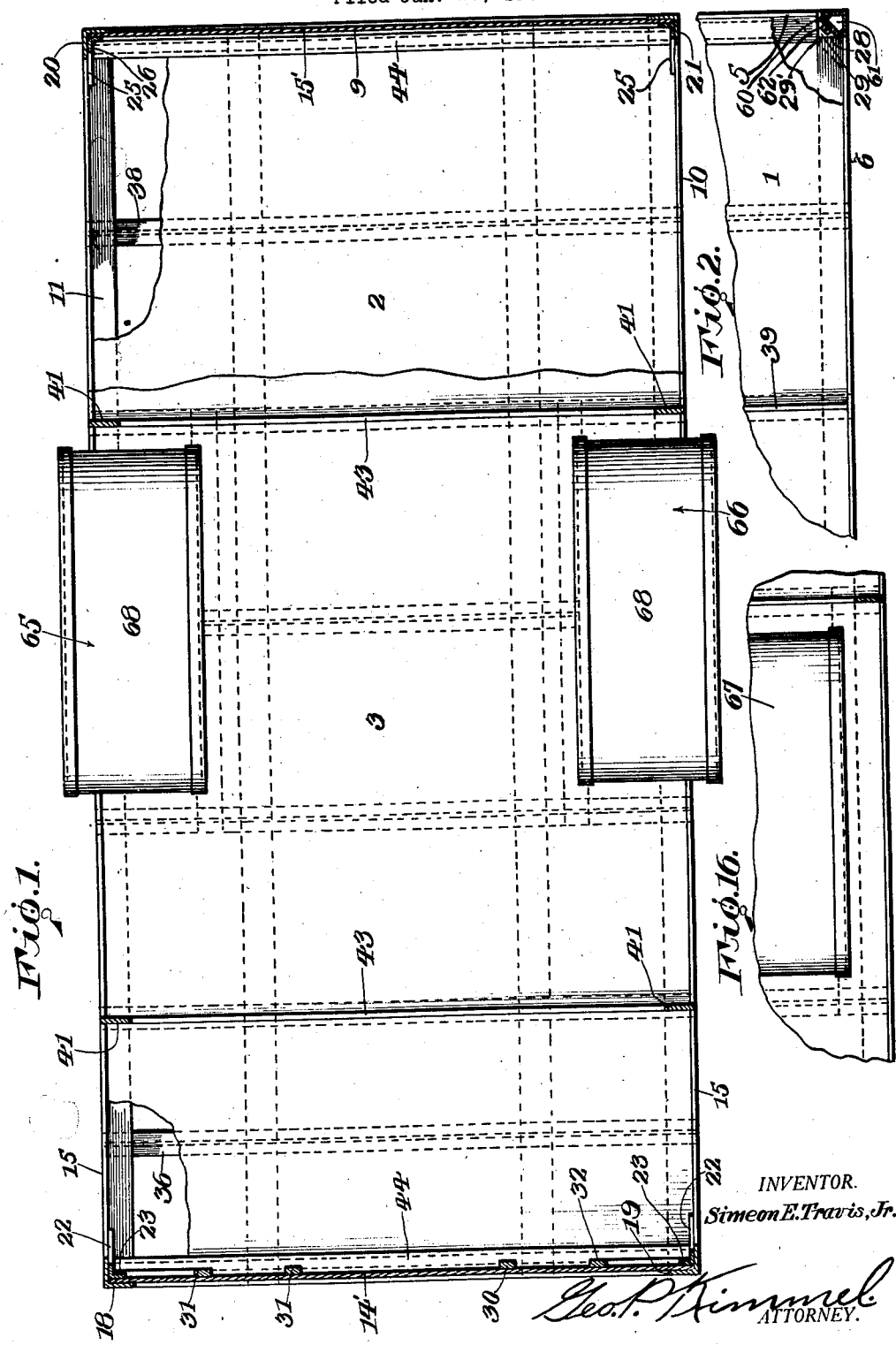

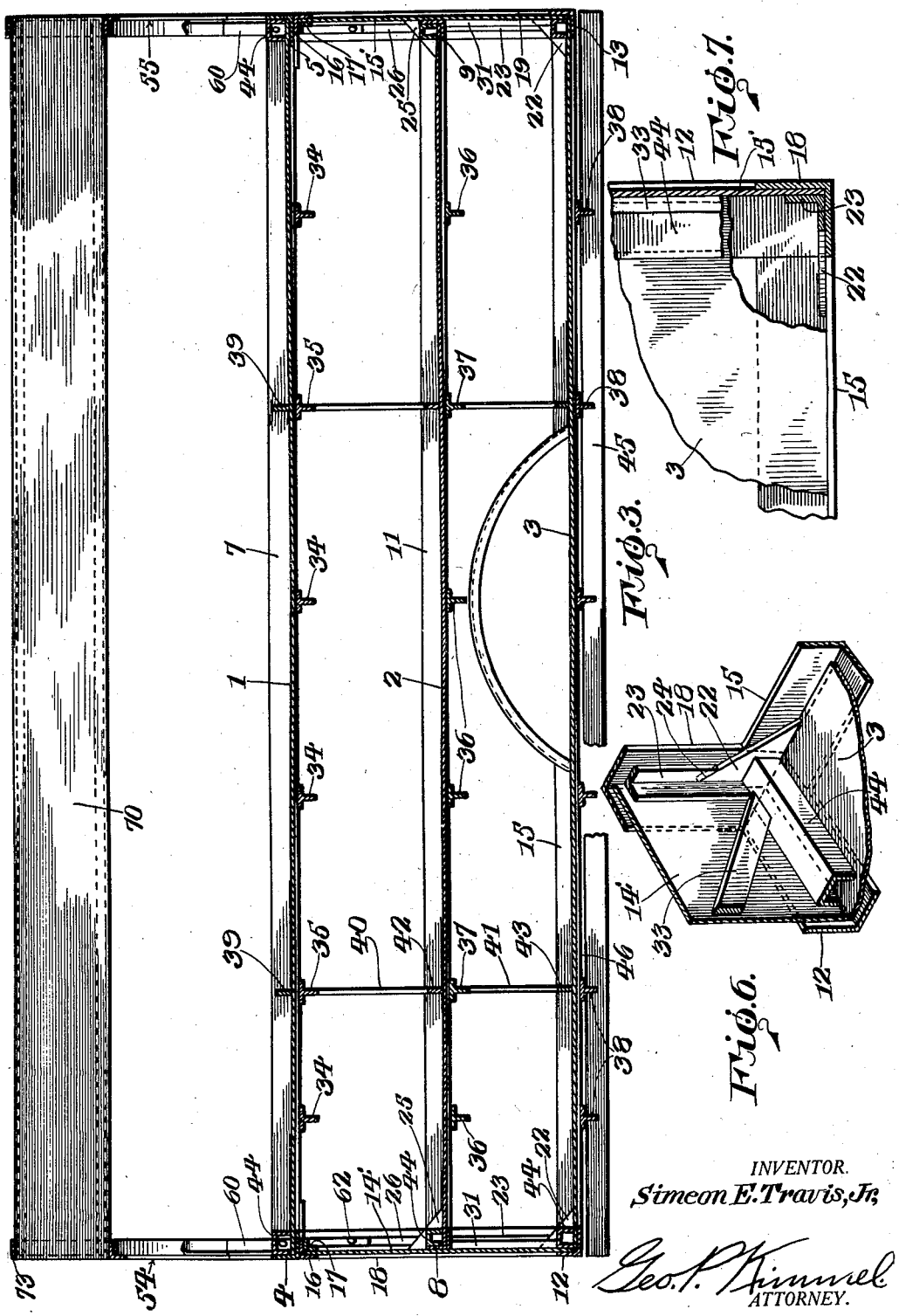

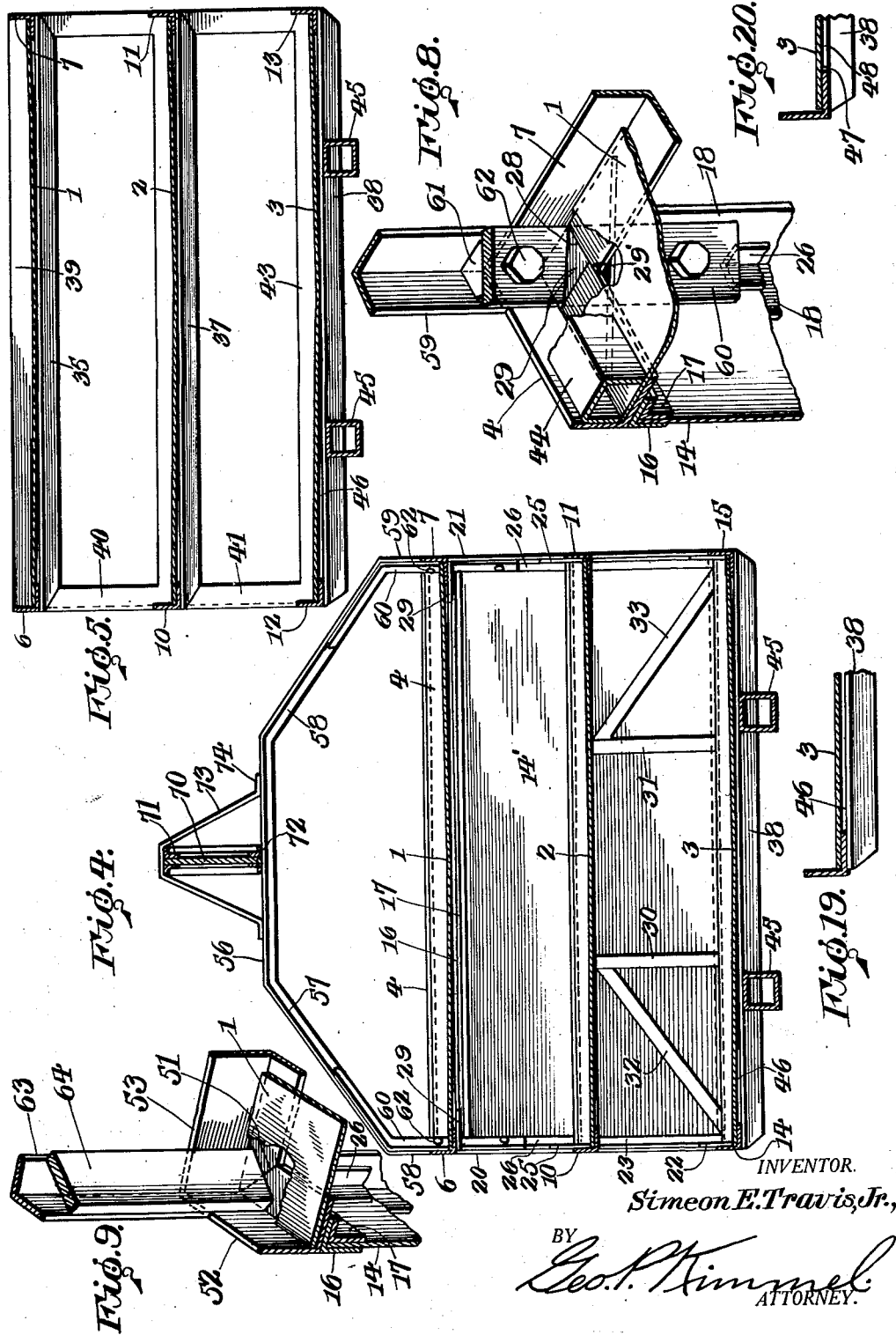

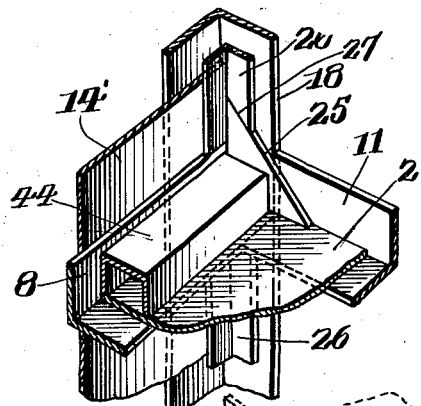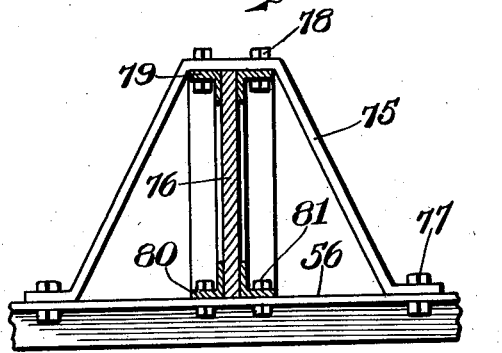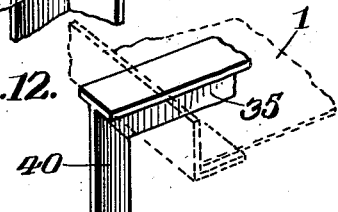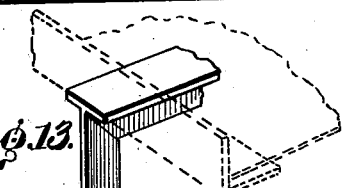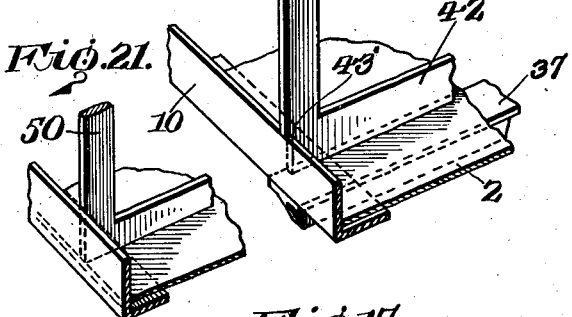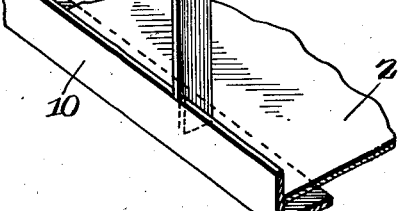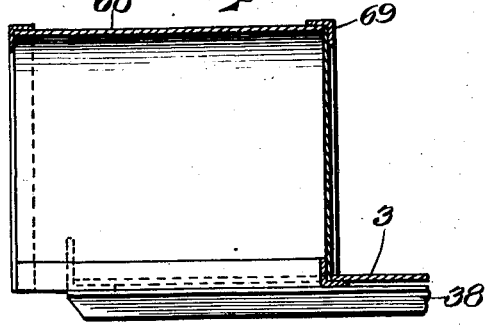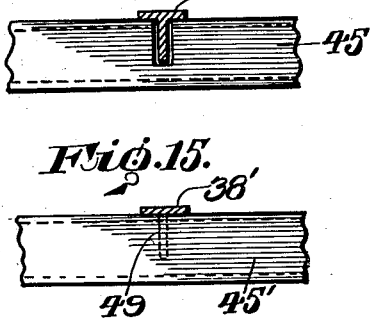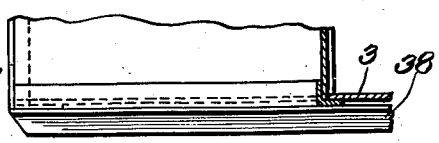

1,828,629

UNITED STATES PATENT OFFICE

SIMEON E. TRAVIS, JR., OF HATTIESBURG, MISSISSIPPI, ASSIGNOR TO THE WELD-MECH STEEL PRODUCTS CO., A CORPORATION OF MISSISSIPPI

TRUCK BODY

Application filed January 26, 1928. Serial No. 249,693.

This invention relates to a truck body designed primarily for the handling of crated, cased or boxed bottled goods, but it is to be understood that a truck body, in accordance with this invention, can be employed for any character of haulage for which it is found applicable, and the invention has for its object to provide, in a manner as hereinafter set forth, a truck body having one or more decks and so constructed and arranged that it can be easily loaded and unloaded and carry its load to the best advantage under all road conditions.

A further object of the invention is to provide, in a manner as hereinafter set forth a truck body having one or more decks supported relatively to each other, and with the supporting means for the upper deck or decks constructed and arranged to provide for shortening over all the length of the body resulting in saving in material and construction costs, as well as insuring flexibility which is a valuable asset when travelling over rough roads, and further with the supporting means preferably arranged so as not to interfere with loading or unloading.

A further object of the invention is to provide, in a manner as hereinafter set forth, a truck body having one or more decks and including housing means for the wheels which permits of the truck body being built close to the ground whereby the load on the upper decks can be brought down in convenient reach of the operator standing on ground, under such conditions eliminating the necessity of climbing on the truck, and further lowering the center of gravity of the load resulting in the reduction of wear and tear on the truck chassis and tires, or its possibility of overturning on rough roads.

Further objects of the invention are to provide, in a manner as hereinafter set forth, a truck body designed to be attached to any form of chassis and which is simple in its construction and arrangement, strong, durable, compact, thoroughly efficient when used, readily installed with respect to the chassis, of minimum weight and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a fragmentary view, in sectional plan, of a modified form of truck body in accordance with this invention.

Figure 2 is a fragmentary view in sectional plan illustrating one of the corners of the upper deck.

Figure 3 is a longitudinal sectional view of a truck body in accordance with this invention.

Figure 4 is a transverse section of the truck body.

Figure 5 is a transverse sectional view illustrating the supporting means for the decks and the spacing means for the crates or boxes.

Figure 6 is a fragmentary view in perspective of one of the lower corners of the truck body.

Figure 7 is a fragmentary view in sectional plan of a corner of the truck body.

Figure 8 is a fragmentary view in perspective of one of the corners of the upper deck.

Figure 9 is a fragmentary view in perspective of one of the corners of the upper deck illustrating a modified form.

Figure 10 is a fragmentary view in perspective of one of the corners of an intermediate deck.

Figure 11 is a cross sectional view of a detachable display or sign bar.

Figure 12 is a fragmentary view in perspective illustrating the supporting means for an upper deck and the spacing means for the crates.

Figure 13 is a view similar to Figure 12 with the spacing means omitted.

Figure 14 is a fragmentary view in secton illustrating a transverse floor support and sub-sill.

Figure 15 is a view similar to Figure 14 of a floor support and sill illustrating a modified arrangement.

Figure 16 is a fragmentary view in plan illustrating a fender or housing construction.

Figures 17 and 18 are fragmentary views in section of fender constructions.

Figures 19 and 20 are sectional details illustrating different arrangements of floor supports.

Figure 21 is a fragmentary view in perspective illustrating a modified form of deck support and crate spacing means.

A truck body, in accordance with this invention, is illustrated by way of example as being constructed with an intermediate, a lower and a top deck, but it is to be understood that a truck body in accordance with this invention can be constructed with one or more decks. The floors of the upper, intermediate and lower decks are indicated at 1, 2 and 3 respectively and each of which is constructed of sheet metal of the desired gauge. The floor 1 of the top deck is supported by a pair of end rails 4, 5 and a pair of side rails 6, 7. The floor 2 of the intermediate deck is supported by a pair of end rails 8, 9 and a pair of side rails 10, 11. The floor of the lower deck is supported by a pair of end rails 12, 13 and a pair of side rails 14, 15. The several end rails are of less length than the several side rails whereby the truck body will be of rectangular contour. The several side and end rails are of angle shaped cross section to provide a vertical and a horizontally disposed leg or portion and with the latter extending inwardly from the bottom of the former. The floors of the decks are mounted on and secured to the horizontal portions of the side and end rails.

Common to the forward ends of the intermediate and lower decks is an end plate 14' constituting a closure for such ends, and common to the rear ends of the intermediate and lower decks is an end plate 15' which provides a closure. The end plate 14' is termed the front end plate and the end plate 15' the rear end plate. The front plate 14' is seated upon the flooring 3, abuts against the inner face of the vertical portion of the end rail 12, against the outer face of the vertical portion of the end rail 8 and against the inner face of the horizontal portion of a supporting rail 16 upon which is mounted the end rail 4. A retaining rail 17 of angle shaped cross section is positioned against the inner face of the plate 14' and also against the horizontal portion of the rail 16. The forward end of the truck body includes front corner rails 18, 19 and the rear end of the truck body includes rear corner rails 20, 21. The front and rear corner rails are angle shaped in cross section.

The forward and rear corners of the lower deck are of like construction. The forward and rear corners of the intermediate deck are of like construction, and the forward and rear corners of the top or upper deck are of like construction. But one corner construction will be described in connection with the lower deck, as the description thereof will apply to the other corner constructions of the lower deck, and this statement will apply to the corner constructions of the intermediate deck, as well as the upper or top deck. Figure 6 illustrates the construction for each of the corners of the lower deck and by reference thereto the corner rail 18 has one of the legs thereof mitered to the vertical leg of end rail 12. The horizontal leg of end rail 12 abuts against the inner face and is welded to the other leg of the corner rail 18. The side rail 15 abuts against and is welded to the end rail 12 and corner rail 18. The flooring 3 is positioned upon the horizontal legs of the rails 12 and 15 and abuts against the vertical legs of such rails as well as the inner faces of the legs of the rail 18. A gusset plate 22 is arranged and secured to the rails 15 and 18. The gusset 22 is vertically disposed. The end plate 14' is positioned against the inner face of the vertical leg of the rail 12, against the inner face of that leg of the rail 18 which is mitered to the leg 12 and further abuts against the inner face of the other leg of rail 18. An angle shaped retaining member 23 is positioned against the plate 14' and also against the inner face of one of the legs of the rail 18 and secured therewith. The retaining member 23 is cut away as at 24 to provide a clearance for the gusset plate 22.

Figure 10 illustrates the manner of setting up each of the corners of the intermediate deck and the constructive arrangement shown in Figure 10 will apply to each corner of the intermediate deck and by reference to Figure 10 which shows one of the forward corners of the intermediate deck the corner rail 18 has one of its legs overlapping the plate 14' as well as being welded thereto. The end rail 8 is arranged against the inner face of the plate 14' and abuts against the inner face of the leg 18. The rail 11 abuts against and is welded to one of the legs of the rail 18 and against the horizontal leg of the rail 8. Positioned against the inner face of the rails 11 and 18 is an upstanding gusset plate 25. Abutting against the plate 14' and also the inner face of the rail 18, as well as being secured therewith is a vertical retaining member 26 which is cut away as at 27 to provide a clearance for the gusset plate 25. The member 26 is of angle shape and has one of its legs seated on the top edge of the rail 8.

Figure 8 illustrates one manner of setting up each of the corners of the upper deck and the description thereof will apply to each of said corners. The horizontal leg of the rail 4 and the horizontal leg of the rail 7 is cut away to provide an opening 28. Said horizontal legs, however, are of a width and length whereby a portion of the end edge of the horizontal leg of the rail 7 will abut against the free side edge of the horizontal leg of the rail 4. The abutting edges are welded together as at 29'. The vertical legs of the rails 4 and 7 abut at the ends thereof and are welded together. The corner rail 18 has its upper end secured to the bottom of the vertical legs of the rails 4 and 7. Welded against the lower faces of the horizontal legs of the rails 4 and 7 is a gusset plate 29 and against which abuts the rail 16 and retaining member 17. The gusset plate 29 has its inner side edge secured to the rail 16 and retaining member 17. The horizontal leg of the rail 4 is welded to the rail 16 and retaining member 17. The purpose of the opening 28 will be hereinafter referred to.

Each end of the truck body between the intermediate and lower decks is provided with reinforcing means of like construction and the description of one will apply to the other. With reference to Figure 4 which shows the reinforcing means the latter consists of a pair of uprights 30, 31 arranged in spaced relation and in the form of flat brace bars and which extend from the end rail 8 to the end rail 12. Extending from the upright 30 to the side rail 14 is an inclined brace member 32 and extending from the upright 30 to the side rail 15 is an inclined brace member 33. The elements 30 to 33 inclusive provide a truss arrangement.

Depending from the lower face of the flooring 1, extending transversely with respect thereto and having their ends welded to the side rails 6 and 7 are spaced transversely extending T-shaped brace members. Certain of said brace members are indicated at 34 and the others at 35. Depending from the lower face of the flooring 2 and extending transversely with respect thereto are spaced transversely extending brace members which are welded to the side rails 10 and 11. Certain of said brace members which are secured to the flooring 2 are indicated at 36 and the others at 37. Depending from the lower face of the flooring 3 and extending transversely with respect thereto, as well as being welded to the side rails 14, 15 are spaced T-shaped brace members 38. Secured to the upper face of the flooring 1, as well as the side rails 6, 7 are transversely extending spacer members 39 standing on a longitudinal edge and arranged in spaced relation to divide the upper deck into compartments and also to prevent the crates or boxes abutting each other or in other words to prevent the crates or boxes loaded in one compartment shifting or abutting against the crates or boxes loaded in adjacent compartments of the upper deck. The flooring 1, intermediate its ends, is supported from the flooring 2 by a plurality of pairs of brace members 40. The flooring 2 is supported from the flooring 3 by vertically disposed spaced pairs of brace members 41. Each pair of brace members 40 or 41 are arranged in spaced relation and oppose each other. The said brace members are set up in a manner whereby the end edges thereof will extend transversely with respect to the flooring. Arranged between and connected to the brace members of each pair 40, at the lower ends of these latter, are spacer members 42 standing on a longitudinal edge and arranged between the brace members of each pair 41, as well as being connected to the lower portions thereof is a spacer member 43. The spacer members 42 and 43 perform the same function as the spacer members 39. The spacer members 42 and 43 are welded to the floorings 2, 3 respectively. With reference to Figure 12 the arrangement of a brace member 40 with respect to a brace 35 and also with respect to a spacer member 42 is shown. Figure 12 illustrates a brace member 40, T-shaped brace 35 and a spacer member 42. The brace member 40 is mitered to the T-shaped brace 35 and is welded to the spacer member 42. The brace member 40 is mortised as at 43' so as to overlap the vertical leg of the rail 15. The brace members 41 are constructed in the same manner as the brace members 40 and are secured to the spacer members 43 and T-shaped braces in the same manner as the braces 40 and spacer members 42. The brace members 40 of each pair are mitered to a T-shaped brace 35 and secured to the spacer member 42. The brace members 41 of each pair are mitered to a T-shaped brace 37 and welded to a spacer member 43. Provided at each end of the floorings 1, 2 and 3 and secured to the upper face thereof is a transversely extending inverted channel iron 44 to prevent the crates or boxes from shifting in the corners of the several decks and said channel irons 44 act as spacer members between the crates or boxes and the end plates 14, 15.

Positioned below the flooring 3 are channelled or grooved sub-sills 45 arranged in spaced relation and having the vertical legs of the T-shaped braces 38 extending therethrough and welded thereto. See Figure 4.

With reference to Figure 19 the T-shaped braces 38 are illustrated as having their heads secured to the horizontally extending legs of the side rails of the deck 3, also see Figure 4 with respect to this arrangement. Setting up the braces 38 in the manner as stated provides a space between the flooring 3 and the heads of the brace members. The space is indicated at 46. With reference to Figure 20, however, the heads of the T-shaped braces 38 are cut away to provide a clearance so that the stems of such braces can be secured to the horizontally disposed legs of the side rails 14 and 15. The cut away portions of the brace portions 38 are indicated at 47. In the form shown in Figure 20 the heads of the braces 38 are secured to the flooring 3 as indicated at 48. With reference to Figure 14, it illustrates the stems of the braces 38 extending through the sub-sills 45. Figure 15, however, illustrates the cutting away, at spaced points of the stem of the T-braces 38' for the flooring 3 and the passing of non-channelled or non-grooved sub-sills 45' through the cut away portions. Each sub-sill 45' being secured to parallel T-braces 38'. The opening formed in the stem of the brace 38' for the passage of the sub-sill is indicated at 49.

With reference to Figure 13 the construction shown thereby is the same as that illustrated in Figure 12 with this exception that the spacer members are not employed. With reference to Figure 21 a modified form of brace which is employed between the lower and intermediate decks and intermediate and upper decks is shown and said brace is indicated at 50. The difference between the supporting brace 50 and the braces 40 or 41, is that the brace 50 is not mortised at its lower end whereby the outer side edge of the brace 50 is not flush with the outer face of the vertical leg of the side rail 14 or 15.

Figure 9 illustrates a different structural arrangement with respect to the corners of the upper deck and the difference resides in mitering together the side and end rails as indicated at 51. In Figure 9, 52 indicates an end rail and 53 a side rail. The corner construction illustrated in Figure 8, with respect to the upper deck, is employed for detachably securing in position the supporting means for a display or sign board, whereas the corner construction shown in Figure 9 is employed for rigidly securing the supporting means to the upper deck at the corners thereof. The supporting means for the sign board or display board is connected with the forward and rear ends of the truck body and is set up in a manner whereby the display or sign board will be disposed longitudinally with respect to the truck body, as well as in alignment with the longitudinal median thereof.

The supporting means which is arranged at the forward end of the truck for the sign or display board is similar in construction to the supporting means which is arranged at the rear end of the truck and the description of one will apply to the other. The supporting means for the sign or display board illustrated in Figures 3, 4 and 8 is of the detachable type whereas the form shown in Figure 9 is welded to the side and end rails of the upper deck. The detachable type of supporting means, with reference to Figures 3, 4 and 8 includes a pair of supporting members 54, 55 in the form of an arch and each of which consists of a central flat portion 56, a pair of oppositely extending, depending outwardly inclined intermediate portions 57, 58 and a pair of vertically extending lower portions 58', 59. Each supporting member is set up from an angle bar.

Secured to each intermediate portion and depending below each lower portion is a coupling member 60 provided with spaced apertures. The coupling member conforms in shape to its associated intermediate portion and lower portion of the supporting member. Welded to the inner faces of the vertical legs of the side and end rails of the upper deck is a vertically disposed block which projects above said vertical legs and depends into the intermediate deck. The block is indicated at 61. A block 61 is positioned at each corner of the upper deck and is formed with a pair of spaced sockets having threaded walls. The sockets are adapted to register with the apertures in a coupling member 60. The lower vertical portions of the supporting members are adapted to be seated upon the top edges of the vertical legs of the side and end rails of the upper deck and in this connection see Figure 9. The coupling members 60 extend down through the openings 29. See Figure 8. Holdfast devices 62 are adapted to extend through the apertures in the coupling members 60, and engage with the threaded walls of the sockets in the blocks 61. See Figure 8. The foregoing arrangement provides for detachably connecting the supporting members to the front and rear corners of the truck body.

With reference to Figure 9, the lower vertically extending portions of each of the supporting members for the sign or display board is indicated at 63 and seats on the top edges of the vertical legs of the side and end rails of the upper deck, as well as being welded to said top edge. Welded to the vertically extending lower portion 63 of the supporting member, as well as depending therebelow, is a coupling member 64 which is welded to the side and end rails of the upper deck. The construction and arrangement referred to provides for fixedly securing the supporting members for the sign or display board to the corners of the truck body.

With reference to Figure 1, the flooring 3 is provided with a pair of wheel fenders 65, 66 which are arranged to project laterally from each side of the body of the truck when the wheels are arranged slightly beyond the sides of the truck body. With reference to Figure 16 the truck body is set up with inwardly arranged fenders, only one of which is shown, when the truck body is constructed in the manner to project laterally beyond the wheels. The fender in Figure 16 is indicated at 67. The fender 65, as well as the fender 66 includes an arcuate body portion 68, reinforced as at its sides. The fender 67 is constructed in the same manner as the fender 65 or 66. In Figure 1 the flooring 3 is cut away to provide the necessary clearance for the wheel and the body portion of a fender 65 or 66 is connected with the flooring 3. In Figure 16 the flooring is cut away to provide a clearance for the wheel and the body portion of the fender 67 is connected to the flooring, but the flooring 3 projects laterally with respect to the outer side of the fender.

With reference to Figure 4 the sign or display board is fixedly secured to the intermediate portions 56 of the supporting members 54, 55. The sign or display board is indicated at 70 and is not removable. The sign board 70 is positioned between a pair of oppositely disposed frames 71, 72 of rectangular contour, co-extensive with the board 70 and flush with the top, bottom and end edges of the latter. The body of each frame is of angle-shaped cross section. The bottoms of the frames are welded to the intermediate portions 56 of the supporting members. Combined bracing and retaining straps 73 extend over the pair of frames at the top thereof, as well as being welded thereto. The straps 73 are flanged as at 74 and welded to the intermediate portions 56 of the supporting members.

With reference to Figure 11, a construction of detachable sign or display board is illustrated and the retaining or bracing straps 75 for the board 76, are detachably connected by the holdfast devices 77, to the intermediate portions 56 of the supporting members. The bracing and retaining straps 75 are detachably connected by the holdfast devices 78 to a pair of oppositely disposed frames 79, similar to the frames 71, 72. The frames 79, have their bottoms 80 detachably connected to the intermediate portions 56 of the supporting members by the holdfast devices 81. The frames 79 are arranged relative to the board 76 in the same manner as the frames 71, 72 with respect to the board 70.

The setting up of the end plates 14 and 15, in the manner as stated, gives the truck body a panel appearance from the front or rear. The setting up of the brace members on edge so that the edge will extend transversely with respect to the flooring of the intermediate and lower decks shortens over all the length of the body, saves material and construction costs, provides flexibility and assists travelling over rough roads. The supports or braces between the top and intermediate deck and intermediate deck and bottom deck are placed at junction of cases so as not to interfere with loading or unloading. The truss construction at each end increases strength without excessive weight and further the truss construction is not visible from the outside.

It is thought the many advantages of a truck body, in accordance with this invention can be readily understood, and although the preferred embodiment of the invention is as illustrated and described, yet it is to be understood that changes in the details of construction can be had which fall within the scope of the invention as claimed.

What I claim is:

1. A truck body comprising an upper, an intermediate and a lower deck, each of said decks including side and end rails of angle shaped cross section to provide vertical and horizontal portions and with the latter extending inwardly from the lower end of the former, each of said decks further including a flooring terminating at and directly secured to the horizontal portions of said side and end rails and positioned below the top edges of said vertical portion, corner rails common to the side and end rails of the said several decks, spaced supporting braces between the sides of the flooring of the intermediate deck and the sides of the flooring of said upper and lower decks, said braces disposed on the end edges thereof, said end edges extending transversely with respect to said floorings and having their lower ends positioned below the top edges of the vertical portions of the side rails of the intermediate and lower decks and secured to the sides of the floorings of such decks.

2. A truck body comprising an upper, an intermediate and a lower deck, each of said decks including side and end rails of angle shaped cross section to provide vertical and horizontal portions and with the latter extending inwardly from the lower end of the former, each of said decks further including a flooring terminating at and directly secured to the horizontal portions of said side and end rails and positioned below the top edges of said vertical portion, corner rails common to the side and end rails of the said several decks, spaced supporting braces between the sides of the flooring of the intermediate deck and the sides of the floorings of said upper and lower decks, said braces disposed on the end edges thereof, said end edges extending transversely with respect to said floorings and having their lower ends positioned below the top edges of the vertical portions of the side rails of the intermediate and lower decks and secured to the sides of the floorings of such decks, and spacer members extending transversely of the floorings of said lower and said intermediate decks, said spacer members positioned on a longitudinal edge thereof and arranged between and secured to said braces.

3. A truck body comprising an upper, an intermediate and a lower deck, each of said decks including side and end rails of angle shaped cross section to provide vertical and horizontal portions and with the latter extending inwardly from the lower end of the former, each of said decks further including a flooring terminating at and directly secured to the horizontal portions of said side and end rails and positioned below the top edges of said vertical portion, corner rails common to the side and end rails of the said several decks, spaced supporting braces between the sides of the flooring of the intermediate deck and the sides of the floorings of said upper and lower decks, said braces disposed on the end edges thereof, said end edges extending transversely with respect to said floorings and having their lower ends positioned below the top edges of the vertical portions of the side rails of the intermediate and lower decks and secured to the sides of the floorings of such decks, spacer members extending transversely of the floorings of said lower and intermediate decks, said spacer members positioned on a longitudinal edge thereof and arranged between and secured to said braces, and transversely extending spacer members secured to the flooring of the upper deck and positioned on a longitudinal edge thereof.

4. A truck body comprising an upper, intermediate and a lower deck, each including a flooring, spaced T-shaped braces secured to the lower faces of said floorings transversely thereof and having mitered ends, spaced vertical braces between the sides of the floorings of said decks, said vertical braces having their lower ends secured to the floorings of the intermediate and lower decks, and said vertical braces having their upper ends mitered to and secured to the ends of the T-shaped braces secured to the lower faces of the floorings of the upper and intermediate decks.

5. A truck body comprising an upper, intermediate and a lower deck, each including a flooring, spaced T-shaped braces secured to the lower faces of said floorings transversely thereof and having mitered ends, spaced vertical braces between the sides of the floorings of said decks, said vertical braces having their lower ends secured to the upper faces of the sides of the floorings of the intermediate and lower decks, said vertical braces having their upper ends mitered to and secured to the ends of the T-shaped braces secured to the lower faces of the floorings of the upper and intermediate decks, and said vertical braces standing on their end edges and with said end edges disposed transversely with respect to said floorings.

6. A truck body comprising an upper, intermediate and a lower deck, each including a flooring, spaced T-shaped braces secured to the lower faces of said floorings transversely thereof and having mitered ends, spaced vertical braces between the sides of the floorings of said decks, said vertical braces having their lower ends secured to the floorings of the intermediate and lower decks, said vertical braces having their upper ends mitered to and secured to the ends of the T-shaped braces secured to the lower faces of the floorings of the upper and intermediate decks, and spacer members secured on a longitudinal edge upon the floorings of said intermediate and lower decks and having their ends secured to the lower portion of the inner side edges of said vertical brace members.

7. A truck body comprising upper, intermediate and lower decks each including a pair of end and a pair of side rails, said rails having inwardly extending, horizontal portions, a flooring secured upon said horizontal portions of the rails of each deck, and braces having their ends secured to horizontal portions of opposed rails of each deck and depending from a flooring, said braces being of T-shape and of a length corresponding to the distance between the said opposed rails, said braces including heads and stems, the ends of the braces being secured to the horizontal portions of said opposed rails, and that part of the flooring between the horizontal portions of said rails being normally spaced from said heads.

8. A truck body comprising upper, lower and intermediate decks, each deck including a pair of end rails and a pair of side rails, each of said rails including a horizontal portion and a vertical portion extending upwardly from the outer side of the horizontal portion, a flooring secured upon the upper faces of said horizontal portions and positioned below the top edges of the said vertical portions, and spaced transversely extending spacing means mounted upon said floorings and extending from the vertical portion of one side rail to the vertical portion of the other side rail.

In testimony whereof, I affix my signature hereto.

SIMEON E. TRAVIS, Jr.